J. W. COSGROVE & E. ERICKSON.
MACHINE FOR OPERATING UPON INSOLES.
APPLICATION FILED MAR. 20, 1914.
1,246,237.
Patented Nov. 13, 1917.
5 SHEETS—SHEET 1.
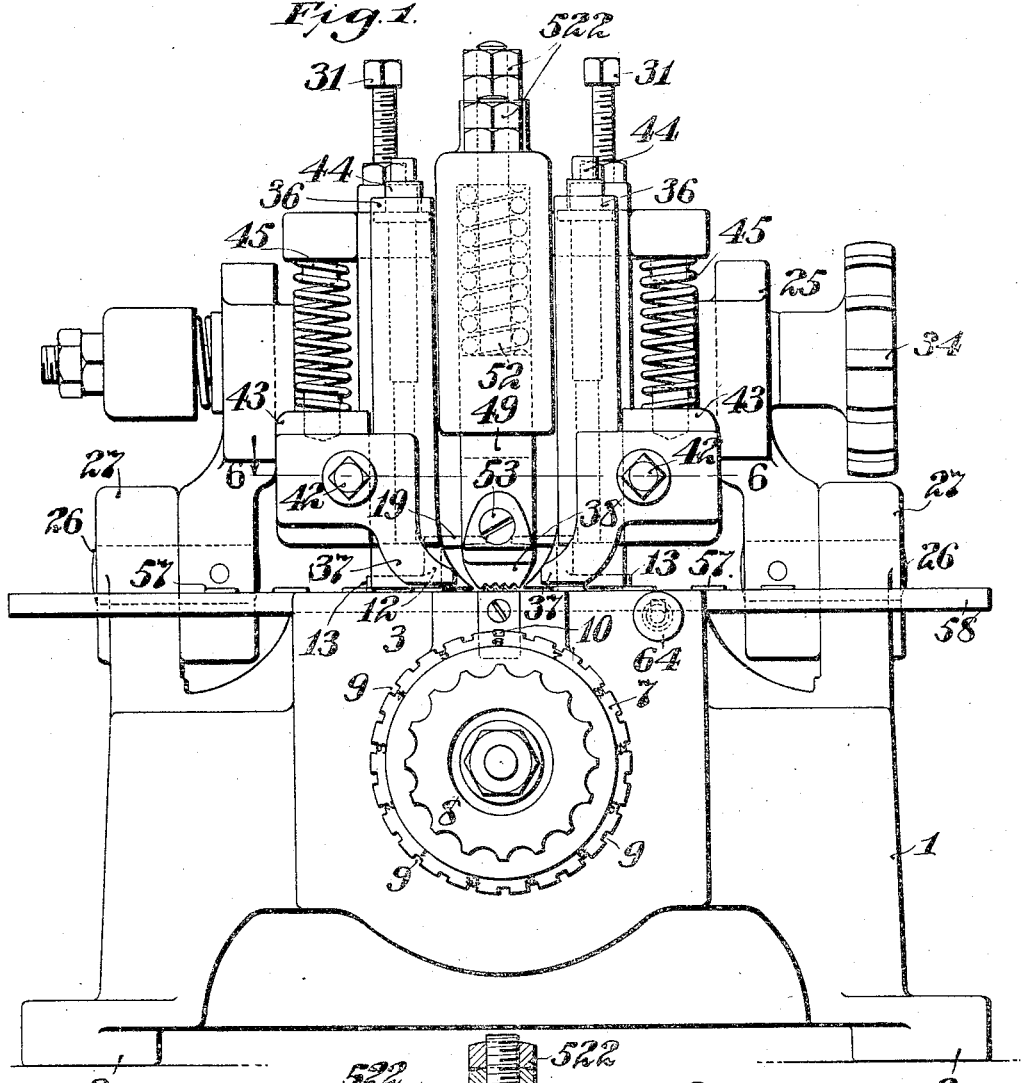
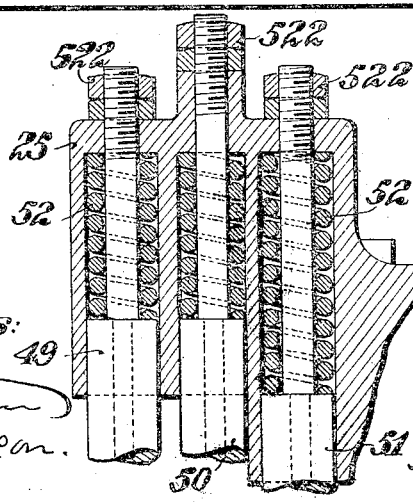

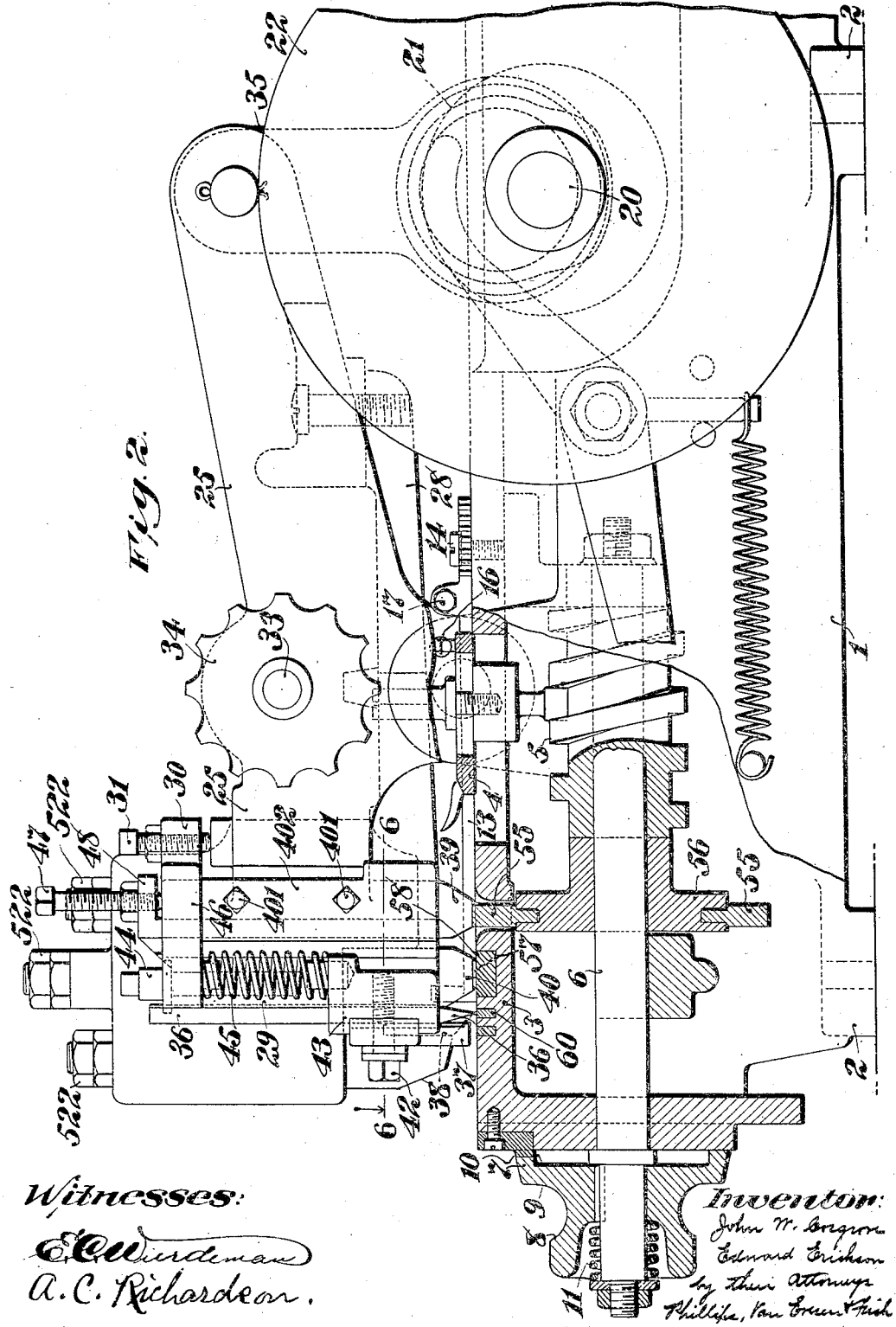

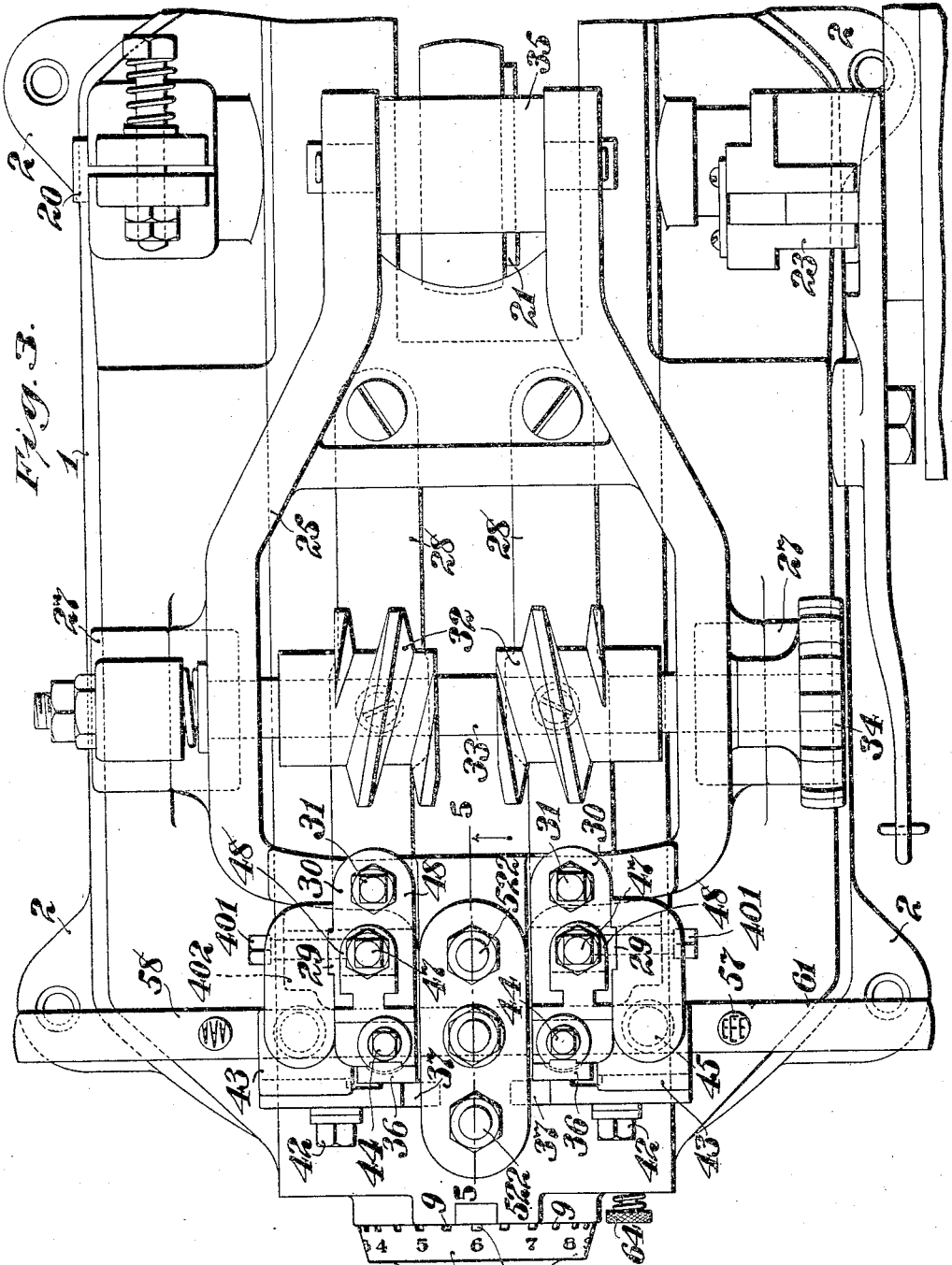

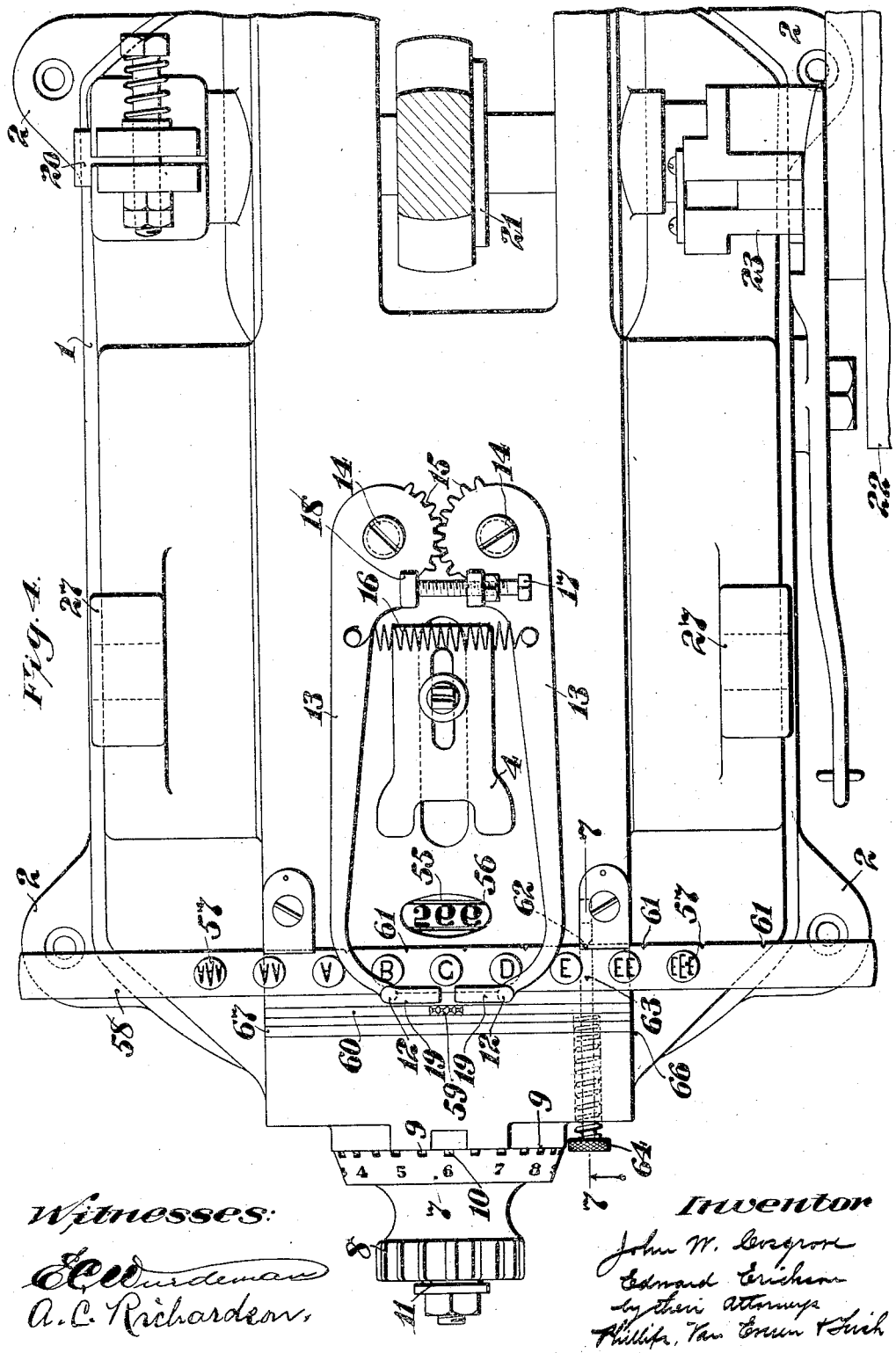

J. W. COSGROVE & E. ERICKSON.
MACHINE FOR OPERATING UPON INSOLES.
APPLICATION FILED MAR. 20, 1914.
1,246,237.
Patented Nov. 13, 1917.
5 SHEETS—SHEET 5.
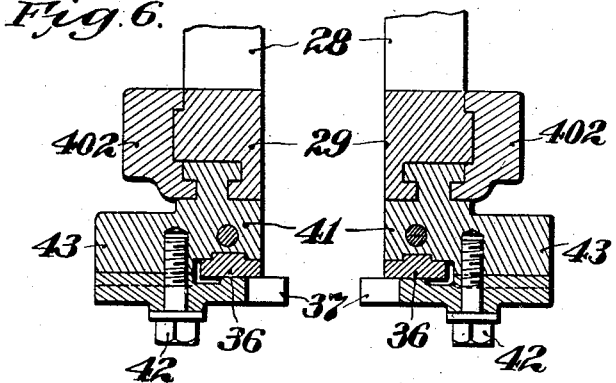
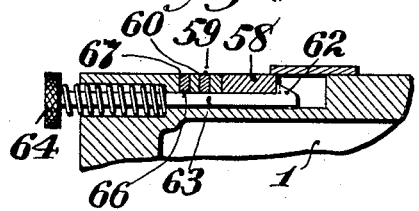
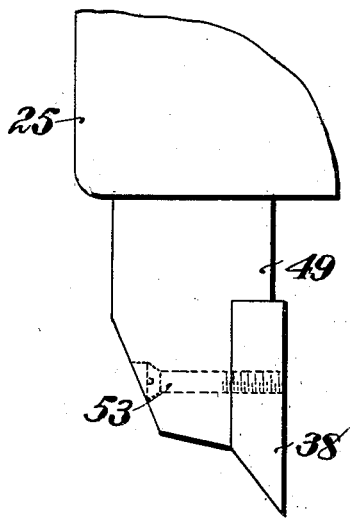
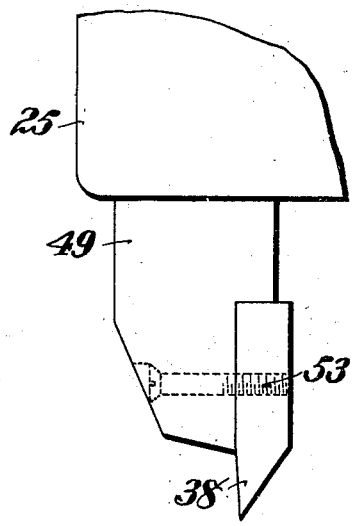
Witnesses:
Inventor
John W. Cosgrove
Edward Erickson
by their attorneys
Phillips, Van Everen & Fish

UNITED STATES PATENT OFFICE.

JOHN W. COSGROVE, OF MEDFORD, AND EDWARD ERICKSON, OF BEVERLY, MASSACHUSETTS, ASSIGNORS TO UNITED SHOE MACHINERY COMPANY, OF PATERSON, NEW JERSEY, A CORPORATION OF NEW JERSEY.

MACHINE FOR OPERATING UPON INSOLES.

1,246,237.   Specification of Letters Patent.   Patented Nov. 13, 1917.

Application filed March 20, 1914. Serial No. 825,971.

*To all whom it may concern:*

Be it known that we, JOHN W. COSGROVE and EDWARD ERICKSON, citizens of the United States, residing at Medford, Middlesex county, and Beverly, Essex county, and State of Massachusetts, have invented certain new and useful Improvements in Machines for Operating upon Insoles; and we do hereby declare the following to be a full, clear, and exact description of the invention, such as will enable others skilled in the art to which it appertains to make and use the same.

The present invention relates to machines for operating upon insoles, and more particularly to that class of machines which form transverse cuts or incisions extending part way through the insole at the margin thereof where the stitch-receiving groove terminates, and which also apply guiding and identification marks to one or both surfaces of the insole.

The object of the present invention is to improve machines of the above class, and more particularly machines of the general type disclosed in the patent to Miller Cook, Jr., No. 957,598, dated May 10th, 1910, and in his application Serial No. 376,280, filed May 29th, 1907, by rendering the same more convenient, certain, and efficient in operation, especially upon soles of varying thickness and of varying densities, and further by providing for variations in the relative longitudinal positions of the cuts and guiding marks.

With these objects in view, the present invention consists in the devices and combinations of devices hereinafter described and more particularly defined in the claims.

In the accompanying drawings which illustrate what is now considered to be the preferred embodiment of the present invention, Figure 1 is a front elevation of the machine; Fig. 2 is a side elevation partially in section; Fig. 3 is a plan view; Fig. 4 is a plan view with the pivoted head removed; Fig. 5 is a detail in vertical section taken on the line 5—5 of Fig. 3, looking toward the left; Fig. 6 is a horizontal section on line 6—6, Figs. 1 and 2, of the front ends of the arms, and parts carried thereby; Fig. 7 is a detail in vertical section on the line 7—7 of Fig. 4, looking toward the left; and Figs. 8 and 9 are detail views of the tool for scoring the flesh side of the insole arranged to score the insole abreast of and in front of, respectively, the transverse cuts in the channel lips.

The machine illustrated in the drawings is of the same general type as those disclosed in the Cock patent and application above referred to, and comprises a base or frame which is provided at the front with work supporting and guiding devices, and at the rear with power-actuating mechanism, an oscillating head or lever pivoted midway its ends being actuated from the driving mechanism and carrying at its front end work-engaging tools or instrumentalities which coöperate with other work-engaging tools or instrumentalities carried by the base of the machine.

The base or frame 1 of the machine, having at its four corners suitable feet 2 for mounting upon a bench, is provided at its front with the work table or support 3 and a back gage 4 to contact with the heel end of the insole, and position the latter longitudinally. This gage is adapted to be adjusted for different length sizes of insole by means of the cam 5 mounted upon the shaft 6, a dial 7 and handle 8 being secured upon the shaft for turning the latter, this construction being substantially as shown in the Cock application. In order to avoid accidental movement of the handle and dial and displacement of the gage, the handle and dial are splined upon the shaft 6 and the rear face of the dial is provided with a series of notches 9 to receive a tooth or projection 10 on the base of the machine, a spring 11 normally holding a notch on the dial and the tooth in engagement.

The insole is positioned laterally by means of a pair of side gages 12 at the front ends of pivoted arms 13 mounted upon the studs 14 and connected by the intermeshing gear segments 15. A spring 16 tends normally to force the side gages 12 toward one another, such movement, however, being limited by means of an adjustable stop screw 17 mounted upon one of said arms and adapted to engage an abutment 18 upon the other. In order to prevent the insole from riding up over the tops of the side gages, the latter are provided with the horizontally projecting portions 19 which project over the surface of the insole adjacent the margin.

The power-actuating mechanism is substantially like that shown in the Cook application, and comprises a driving shaft 20 mounted in suitable bearings in the rear of the machine, carrying an eccentric 21 and arranged to be driven from the constantly rotating belt pulley 22 through one-revolution clutch mechanism 23.

The oscillating head or lever 25 is also similar to that shown in the Cook application, and comprises an open frame mounted to oscillate midway its ends upon bearing studs 26 in ears 27 rising from the base of the machine. Pivoted upon the oscillating lever near the rear end thereof are the knife-carrying arms or members 28, each having an upturned front end 29 provided with the rearwardly extending lip 30 through which passes the clamping screw 31 which engages the top of the head 25 and clamps the front end of the arm firmly against the head. The arms 28 are adapted to be adjusted toward and from one another for insoles of different widths by means of the helical cams 32 mounted upon the shaft 33 carrying the adjusting handle 34. A link 35 is connected at its upper end to the rear of oscillating head or lever 25 and is provided at its lower end with an eccentric strap surrounding the eccentric 22.

The work-engaging tools or instrumentalities carried by the oscillating head comprise two separate cutting knives 36, and a presser-foot 37 for each knife connected therewith, these parts being carried by the arm or members 28, while an upper scoring tool 38 and two presser-feet 39 and 40 are mounted directly upon the front end of the open frame, one of the presser-feet 39 coöperating with the size marking dies mounted in the work table and the other presser-foot 40 coöperating with the width marking dies also located in the work table.

It will be observed that these various work-engaging tools are located at different distances from their axis of oscillation, so that if such parts were mounted rigidly upon the oscillating lever, variations in the thickness of the stock or work would interfere with the proper action of these instrumentalities. Furthermore, variations in the hardness or density of an insole beneath the different tools or instrumentalities might result in imperfect cutting or marking of the insole. To avoid these objections the different work-engaging tools have been mounted so that they may yield not only independently of one another, but also independently of the oscillating lever, so that no adjustment of the connection between the rear end of the oscillating lever and the eccentric is required when there is a change in the thickness of the stock being operated upon.

Secured to the side of each end 29 of the knife carrying arms 28 by means of screws 401 on the plate or block 402, which forms with the upturned end 29 a vertical dovetailed groove (see Fig. 6) in which is slidingly mounted the knife carrier 41, clamped to the front of which is the knife 36 by means of the presser-foot 37 and clamping screw 42 which enters the lateral extension 43 from the lower portion of the knife carrier. The knife is adjusted vertically on the knife carrier by means of the screw 44 having the flange near its upper end which enters an arc-shaped slot in the rear face of the knife. The knife carrier, and with it the knife and presser-foot, is normally held down by means of the spring 45 located between the extension 43 on the knife carrier and the projection 46 from the upper portion of the block 402 on the knife-carrying arm 28. A stop screw 47 mounted in the rearwardly extending ear 48 at the top of the knife carrier limits the downward movement of the carrier under the action of spring 45. This spring is of sufficient strength so that on the descent of the front end of the oscillating head 25 the knives will cut into the insole until the presser-feet 37 contact with the surface of the sole, whereupon the springs will yield under further movement of the oscillating lever. The depth of incision is thus determined by the adjustment of the presser-foot with respect to the knife, and in no way depends upon the thickness of the stock or the adjustment of the actuating mechanism.

The front end of the oscillating head itself is provided with three vertical recesses or sockets to receive the upper ends of the carrier 49 for the upper scoring tool 38 and of the shanks 50 and 51 of the presser-feet 39 and 40, respectively. The upper ends of each of these parts are of reduced diameter and are surrounded by the coiled compression springs 52 which normally hold these instrumentalities in their lowermost position with the stop nuts 522 in engagement with the top of the lever 25 but which permit independent vertical movement after a predetermined pressure has been reached. As shown in Fig. 8, the upper scoring tool 38 is provided with an offset work-engaging edge and is detachably mounted upon the lower end of its carrier 49 by means of a screw 53 so that it may be reversed as shown in Fig. 9 to vary the position of the scoring longitudinally of the insole with relation to the incisions.

The work-engaging tools or instrumentalities mounted in the work table or support comprise a series of size marking dies 55 mounted in a rotary carrier or wheel 56 fixed upon the shaft 6, a series of width marking dies 57 mounted in a slide bar 58 located in a transverse slot or groove extending across the work table, and a lower scoring tool 59 mounted upon or formed integral with a slide 60 located in a second and narrower transverse groove extending across the face of the work table. The rotary carrier for the size marking die is so adjusted upon the shaft 6 that when the back gage is set for a particular size of insole the die bearing that number will be in position to engage the bottom face of the insole directly beneath the presser-foot 39. The width marking slide bar 58 is adapted to be independently adjusted by hand to bring the die bearing the proper width letter in position directly beneath the presser-foot 40. A series of notches 61 on the rear edge of the bar is adapted to be engaged by a tooth or projection 62 on the latch 63 having a finger piece 64 and normally held in operative position by means of the coiled spring 65 as shown in Fig. 6.

In order to permit longitudinal variations in the position of the scoring on the under surface of the insole relative to the scoring or incisions on its upper face, there have been provided a second narrow groove 66 extending across the face of the work table, and also a blank slide 67, the surface of which is substantially flush with the surface of the work table. This slide and the slide 60 which carries the lower scoring tool are interchangeable, so that the scoring on the lower side of the insole may be varied as desired.

The operation of the machine illustrated in the drawings is as follows:

The cutting knives and their presser-feet are first relatively adjusted to give the desired depth of cut, and the knife-carrying arms are brought to the proper distance apart for the width of insole to be operated upon. The dial is then set for the size of insole, thus adjusting the back gage and bringing the proper size die into operative position, and the width die is adjusted transversely of the work table to bring the proper width die into position. The insole is now inserted heel first between the side gages and beneath the projections carried thereby and pushed backwardly until the heel end contacts with the back gage. The trip for the one-revolution clutch is then operated, whereupon a single revolution is given the driving shaft, causing the oscillating head to be actuated and bringing the instrumentalities carried by the front end of said lever into contact with the work. The knives cut into the face of the insole until their presser-feet engage the surface of the insole, whereupon the knife carriers yield in the head. The presser-foot 39 forces the insole against the size marking die, yielding when a predetermined pressure is exerted. The presser-foot 40 forces the work against the width marking die and also yields when the predetermined pressure is reached. The upper scoring blade scores the upper surface of the work at the same time that the lower scoring tool marks the lower surface, the upper blade yielding when a predetermined pressure is exerted. The latter portion of the movement of the driving shaft returns the oscillating head to its original position where it comes to rest with its work-engaging instrumentalities out of contact with the insole, which is then withdrawn from the machine and another insole inserted.

While the present invention has been shown and described as embodied in a particular form of mechanism, it is to be understood that the invention is not limited thereto, but may be embodied in many different forms and constructions.

Having thus described the present invention, what is claimed is:

1. A machine for operating on insoles, having in combination, a work table, a movable head, a plurality of work engaging tools carried by the head, and means for positively moving the head a predetermined distance toward the table to impart working strokes to the tools, said tools being mounted on the head to yield independently of the head and of one another after completing their effective working strokes.

2. A machine for operating on insoles having, in combination, a work table, a movable head, means for moving the head toward the work table, knives mounted on the head for cutting transversely into the sole at its opposite edges where the stitch receiving groove is to terminate, and a scoring tool yieldingly mounted in the head to move independently of the knives when arrested by contact with the work.

3. A machine for operating on insoles, having, in combination, a work table, a movable head, means for moving the head toward the work table, knives for transversely cutting into the sole at its opposite edges where the stitch receiving groove is to terminate, a presser foot rigidly connected with each knife so that the knife projects a little beyond the presser foot, and means for yieldingly mounting each knife and its presser foot on the movable head so that the knife and presser foot will move with the head until arrested by contact of the presser foot with the work.

4. A machine for operating on insoles having, in combination, a work table, a movable head, means for moving the head toward the work table, two knives for transversely cutting into the sole at its opposite edges where the stitch receiving groove is to terminate, a presser foot rigidly connected with each knife so that the knife projects a little distance beyond the presser foot, means for yieldingly mounting each knife and its presser foot in the head so that the knife and presser foot will move with the head until the presser foot is arrested by contact with the work, a scoring tool, means for yieldingly mounting the scoring tool on the head so as to move with the head until arrested by contact with the work, and means for impressing identification marks in the sole including a work-engaging tool and means for yieldingly mounting the said tool on the head so as to move with the head until arrested by contact with the work.

5. A machine for operating on insoles, having, in combination, a work table, a movable head, means for moving the head toward the work table, a knife for cutting transversely into the sole at its edge where the stitch receiving groove is to terminate, a presser foot rigidly connected with the knife so that the knife projects a little beyond the presser foot, a work-engaging tool for operating on the sole, and means for yieldingly mounting the knife and tool in the head so as to yield independently of each other when they are arrested by contact with the work.

6. A machine for operating on insoles, having, in combination, a work table, a movable head, means for moving the head toward the work table, a knife for transversely cutting into the sole at its edge where the stitch receiving groove is to terminate, a presser foot rigidly connected with the knife so that the knife projects a little beyond the presser foot, means for impressing identification marks upon the sole including a work engaging tool, and means for yieldingly mounting the knife and its presser foot and the work-engaging tool in the head so as to yield independently when they are arrested by contact with the work.

7. A machine for operating on insoles, having, in combination, a work table, a movable head, means for moving the head toward the work table, a knife for transversely cutting into the sole at its edge where the stitch receiving groove is to terminate, a presser foot rigidly connected with the knife so that the knife projects a little beyond the presser foot, a scoring tool, and means for yieldingly mounting the knife and its presser foot and the scoring tool in the head so as to yield independently when they are arrested by contact with the work.

8. A machine for operating on insoles, having, in combination, a work table, a movable head, means for moving the head toward the work table, a knife for transversely cutting into the sole at its edge where the stitch receiving groove is to terminate, a presser foot rigidly connected with the knife so that the knife projects a little beyond the presser foot, a work-engaging tool mounted on the head, and means for yieldingly mounting the knife and its presser foot in the head so as to yield when arrested by contact with the work.

9. A machine for operating on insoles having, in combination, a work table, a pivoted head mounted to turn about an axis substantially parallel with the work table, two work engaging tools carried by the head, and located at different distances from the axis, means for swinging the head toward the table to impart working strokes to the tools, said tools being mounted on the head to yield independently of one another after completing effective working strokes.

10. A machine for operating on insoles, having, in combination, a work table having a slot therein, a bar mounted to slide in the slot having in its upper face work engaging devices and in its rear edge a series of notches, a latch mounted in the work table and comprising a head at the front of the work table, a shank extending from the head beneath the work table and under the bar, an upstanding arm at the end of the shank for engaging the notches in the bar and a spring tending to draw the latch forward and hold the upstanding arm in contact with the notches.

11. A machine for operating on insoles having, in combination, a work table having transverse slots formed therein, interchangeable bars fitting in the slots, one of said bars carrying a work-engaging tool, and means for pressing the sole against the tool.

12. A machine for operating on insoles, having, in combination, a work table, a movable head, means for moving the head toward the table, a scoring tool on the table, and a scoring tool on the head, said tools being arranged to have their work engaging faces varied in position relatively to one another longitudinally of the sole.

13. A machine for operating on insoles having, in combination, a work table, a movable head, cutting means carried by said head for transversely cutting into the sole at its opposite edges where the stitch receiving groove is to terminate, and a scoring tool on the work table having provision for varying the position of the scoring indentation made by it on the sole longitudinally of the sole and relatively to the cutting means.

14. A machine for operating on insoles having, in combination, a work table, a movable head, cutting means carried by said head for transversely cutting into the sole at its opposite edges where the stitch receiving groove is to terminate, and a scoring tool on the head having provision for varying the position of the scoring indentation made by it in the sole longitudinally of the sole and relatively to the cutting means.

15. A machine for operating on insoles, having, in combination, a work table, a movable head, means for moving the head toward the work table, cutting means on the head for transversely cutting into the sole at its opposite edges where the stitch-receiving groove is to terminate, and a scoring tool mounted on the head, and arranged to have its work-engaging face varied in position longitudinally of the sole and relatively to the position of the cuts made in the sole by the cutting means.

16. A machine for operating on insoles having, in combination, a work table, a movable head, means for moving the head toward the work table, knives mounted on the head for transversely cutting into the sole at its opposite edges where the stitch receiving groove is to terminate, a scoring tool having an offset work scoring edge, and means for reversibly securing the scoring tool to the head so as to vary the position of the scoring indentations on the sole with respect to the transverse cuts made by the knives.

JOHN W. COSGROVE.
EDWARD ERICKSON.

Witnesses:
LILLIAN B. DUPEE,
CHESTER E. ROGERS.

Copies of this patent may be obtained for five cents each, by addressing the "Commissioner of Patents, Washington, D. C."

It is hereby certified that in Letters Patent No. 1,246,237, granted November 13, 1917, upon the application of John W. Cosgrove, of Medford, and Edward Erickson, of Beverly, Massachusetts, for an improvement in "Machines for Operating upon Insoles," errors appear in the printed specification requiring correction as follows: Page 3, line 44, after the word "die" insert the word *bar;* page 4, line 76, claim 9, before the word "effective" insert the word *their;* and that the said Letters Patent should be read with these corrections therein that the same may conform to the record of the case in the Patent Office.

Signed and sealed this 3d day of September, A. D., 1918.

[SEAL.]

F. W. H. CLAY,

*Acting Commissioner of Patents.*

Cl. 12—17.